(12) United States Patent
Takamiya et al.

(10) Patent No.: US 7,424,874 B2
(45) Date of Patent: Sep. 16, 2008

(54) ENGINE WITH INTAKE VALVES OPERATED BY CAMSHAFT

(75) Inventors: Fumio Takamiya, Toyota (JP); Shinji Sadakane, Susono (JP); Toshio Imamura, Okazaki (JP); Motoki Ohtani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 51 days.

(21) Appl. No.: 11/522,427

(22) Filed: Sep. 18, 2006

(65) Prior Publication Data

US 2007/0074686 A1 Apr. 5, 2007

(30) Foreign Application Priority Data

Oct. 3, 2005 (JP) ............................. 2005-290287

(51) Int. Cl.
*F01L 1/34* (2006.01)
(52) U.S. Cl. .................. 123/90.16; 123/90.15; 123/348
(58) Field of Classification Search ............. 123/90.15, 123/90.16, 90.17, 90.18, 345, 346, 347, 348
See application file for complete search history.

(56) References Cited

U.S. PATENT DOCUMENTS

| 5,522,352 | A | 6/1996 | Adachi et al. |
| 6,397,802 | B1 | 6/2002 | Rutschmann et al. |
| 7,204,214 | B2 * | 4/2007 | Miyaji et al. ............. 123/90.15 |

FOREIGN PATENT DOCUMENTS

| DE | 10 2004 006 173 A1 | 8/2005 |
| GB | 2 286 261 A | 8/1995 |
| JP | A 58-9554 | 1/1983 |
| JP | A 58-051204 | 3/1983 |
| JP | A 61-145806 | 9/1986 |
| JP | A 01-300009 | 12/1989 |
| JP | A 2002-188469 | 7/2002 |
| JP | A 2002-371891 | 12/2002 |
| JP | A 2003-056374 | 2/2003 |
| JP | A 2003-515025 | 4/2003 |
| JP | A 2004-308611 | 11/2004 |
| JP | A 2006-104999 | 4/2006 |

OTHER PUBLICATIONS

Luckert, P., et al. "New V8 Gasoline Engine by Mercedes-Benz." *MTZ*, vol. 66, pp. 2-5 (English version), pp. 932-941 (German version), Dec. 2005.
AJ6 Engineering: "The Jaguar AJ-V8 Engine." (Internet Article), pp. 1-10, Jul. 6, 2004. URL: http://web.archive.org/web/20040706160706/http://www.jagweb.com/aj6eng/v8_performance.html>.

* cited by examiner

*Primary Examiner*—Ching Chang
(74) *Attorney, Agent, or Firm*—Oliff & Berridge, PLC

(57) ABSTRACT

In a V-type 8-cylinder engine in which the torque for rotating an intake camshaft is higher when intake valves of a #1 cylinder and a #3 cylinder in a left bank are closed, respective noses of a cam for opening and closing the intake valve of the #1 cylinder and a cam for opening and closing the intake valve of the #3 cylinder are each formed at a phase position displaced by X° (X>0) in the advance direction further from the phase position displaced in the advance direction by 90° with respect to the nose of a cam for opening and closing the intake valve of a cylinder fired after a delay of 180° in crank angle.

4 Claims, 6 Drawing Sheets

ENGINE WITH INTAKE VALVES OPERATED BY CAMSHAFT

This nonprovisional application is based on Japanese Patent Application No. 2005-290287 filed with the Japan Patent Office on Oct. 3, 2005, the entire contents of which are hereby incorporated by reference.

BACKGROUND OF THE INVENTION

1. Field of the Invention

The present invention relates to an engine. In particular, the invention relates to an engine having intake valves operated at a plurality of different intervals by a single camshaft.

2. Description of the Background Art

Types of the crankshaft of the V-type 8-cylinder engine include single-plane crankshaft where crankpins are arranged at an interval of 180° and double-plane (also referred to as dual-plane) crankshaft where crankpins are arranged at an interval of 90°. In the case where a V8 engine having a bank angle of 90° uses a crankshaft with crankpins of the single-plane arrangement, firing of the right bank and firing of the left bank can be caused alternately. In this case, since the four cylinders provided in each bank are fired at regular intervals (180° in crank angle), pulsation of exhaust gas is substantially constant. Therefore, adverse influences of the exhaust pulsation on an output (intake air quantity) are easily suppressed. Thus, the single-plane crankshaft is particularly employed for a vehicle for which output is of primary importance. In contrast, in the case where a crankshaft with crankpins of the double-plane arrangement is used, the good balance of the crankpin arrangement provides less vibrations of the crankshaft. Thus, the double-plane crankshaft is particularly employed for a vehicle for which riding comfort is of primary importance. However, in the case where the double-plane crankshaft is employed, it could occur that the right and left banks cannot be fired alternately and firing is successively caused in one of the banks. Therefore, in each bank, the firing cannot be caused at regular intervals and pulsation of exhaust gas is not constant. Accordingly, it is difficult to suppress adverse influences of the exhaust pulsation on the output (intake air quantity). For example, only a part of a plurality of cylinders is influenced by the exhaust pulsation, possibly resulting in a decrease in quantity of intake air (fresh air) into the cylinder. In this case, the output of the engine as a whole decreases. Accordingly, a technique has been proposed that suppresses a decrease in output due to different quantities of intake air into respective cylinders.

Japanese Patent Laying-Open No. 2003-056374 discloses a variable-valve control apparatus for an engine in which valve characteristics of intake and exhaust valves of each cylinder can be controlled independently of other cylinders, one exhaust pipe is connected to a group of cylinders and, in the group of cylinders, the cylinders are fired at different intervals. In the group of cylinders that are fired at different intervals, valve characteristics of at least one of the intake valve and the exhaust valve of a cylinder that is inferior in intake efficiency to other cylinders are changed so that the intake efficiency is improved. For at least one group of cylinders, the closing timing of the intake valve of a cylinder inferior in intake efficiency is corrected so that the intake air quantity increases. The intake valve and the exhaust valve are driven by an electromagnetic valve apparatus. By feeding electric power to an electromagnet used for closing the valve and feeding electric power to an electromagnet used for opening the valve to energize the magnets, or stopping the feeding, opening and closing of the intake valve and the exhaust valve are controlled.

Regarding the variable-valve control apparatus disclosed in the above-referenced publication, the closing timing of the intake valve that provides the maximum total intake gas quantity by intake inertia is a timing corresponding to a position retarded by a predetermined angle with respect to the bottom dead center. Then, the intake-valve closing timing is corrected so that the timing approaches the timing at which the total intake gas quantity is maximum, and thus the total intake gas quantity can be increased and the intake efficiency of the cylinder which is inferior in intake efficiency can be improved to be equivalent to that of other cylinders. In this way, the potential of the engine as a whole can be improved.

It is noted that the quantity of air sucked into a cylinder could also be influenced by any factor except for the exhaust pulsation. In a V8 engine in which cylinders in each bank are not fired at regular intervals, respective opening/closing timings (crank angles of opening/closing) of the intake valves provided to respective cylinders do not occur at regular intervals as well. Thus, there are the case where any intake valve in a bank is closing while another intake valve in the same bank is opening as well as the case where such intake valve timing does not occur. Here, if the intake valves are operated by the same camshaft, the timing (crank angle) at which the intake valve is closed is delayed for only a part of cylinders. This is because of an increased torque that is necessary for rotating the camshaft and thereby opening the intake valve and a resultant decrease in rotational speed of the camshaft. When the closing timing of the intake valve is delayed, the quantity of air pushed back from the cylinder into the intake manifold while the piston is rising increases, resulting in a decrease in quantity of air sucked into the cylinder. Therefore, the cylinders are nonuniform in terms of intake air quantity. However, since the variable-valve control apparatus for the engine disclosed in Japanese Patent Laying-Open No. 2003-056374 operates intake valves by means of electromagnetic force, no camshaft is provided. Thus, no consideration is given to decrease in rotational speed of the camshaft. Therefore, even if the variable-valve control apparatus for the engine disclosed in Japanese Patent Laying-Open No. 2003-056374 is used to correct the intake valve closing timing so that the timing approaches the timing at which the total intake gas quantity is maximum, the intake valve cannot be closed at the corrected timing. Therefore, a decrease in intake air quantity cannot be suppressed.

SUMMARY OF THE INVENTION

An object of the present invention is to provide an engine for which a decrease in quantity of intake air due to decreased rotational speed of a camshaft can be suppressed.

An engine according to an aspect of the present invention includes a plurality of cylinders, intake valves provided to the cylinders respectively and a camshaft operating the intake valves in a predetermined order. The camshaft changes in rotational speed, during closing operation of at least one of a plurality of intake valves, by starting opening operation of another intake valve. The intake valves are each operated so that the intake valve has a characteristic according to the rotational speed during closing operation of the camshaft.

In accordance with the present invention, the intake valves provided to respective cylinders are operated by the camshaft in a predetermined order. The camshaft is changed in rotational speed, during closing operation of a part of a plurality of intake valves, by starting opening operation of any of other intake valves. During closing operation of an intake valve, if another intake valve is opened, the camshaft has an increased rotational resistance and accordingly has a slower rotational speed. Therefore, for only a part of the cylinders, the closing timing of the intake valve during closing operation is delayed. If the closing timing of the intake valve during the closing operation is delayed, the quantity of air pushed back from the cylinder into the intake manifold while the piston is rising increases, resulting in a decrease in quantity of air sucked into the cylinder. Accordingly, the quantity of sucked air is different between the cylinders. Then, each intake valve is operated to have a characteristic according to the rotational speed, during the closing operation, of the camshaft. For example, each intake valve is operated in the manner that the intake valve has a characteristic as described below. Specifically, the characteristic is that, as the rotational speed of the camshaft during closing operation is slower, the intake valve is closed at a more advanced crank angle. In this way, the intake valve is closed earlier to the degree that cancels the decrease in rotational speed of the camshaft, and thus it can be suppressed that the intake-valve closing timing is delayed actually. Accordingly, the engine can be provided for which a decrease in quantity of intake air due to decreased rotational speed of the camshaft can be suppressed.

Preferably, the characteristic refers to a characteristic that the intake valve is closed at a more advanced crank angle as the rotational speed during closing operation of the camshaft is slower.

In accordance with the present invention, any of the intake valves that is accompanied by a slower rotational speed of the camshaft during closing operation is closed at a more advanced crank angle relative to any intake valve accompanied by a higher rotational speed of the camshaft during closing operation. In this way, the intake valve is closed earlier to a degree that cancels the decrease in rotational speed of the camshaft, and thus it can be suppressed that the intake-valve closing timing is delayed actually. Accordingly, the engine can be provided for which a decrease in quantity of intake air due to decreased rotational speed of the camshaft can be suppressed.

Still preferably, the engine further includes exhaust valves provided to the cylinders respectively so that the exhaust valves are each operated according to the characteristic of the intake valve.

In accordance with the present invention, the exhaust valves provided to respective cylinders are operated according to respective characteristics of respective intake valves. For example, an exhaust valve provided to a cylinder is opened at a more advanced crank angle as the intake valve provided to the same cylinder is closed at a more advanced crank angle. In this way, the cylinders can be made equal to each other in overlap period during which both of the intake valve and the exhaust valve are opened. Accordingly, the cylinders can be made equal to each other in quantity of intake air.

Still preferably, the exhaust valve is opened at a more advanced crank angle as the intake valve provided to the cylinder that is the same as the cylinder to which the exhaust valve is provided is closed at a more advanced crank angle.

In accordance with the present invention, the exhaust valve provided to each cylinder is opened at a more advanced crank angle as the intake valve provided to the same cylinder is closed at a more advanced crank angle. In this way, the cylinders can be made equal to each other in overlap period during which both of the intake valve and the exhaust valve are opened. Accordingly, the cylinders can be made equal to each other in quantity of intake air.

Still preferably, the engine is a V-type 8-cylinder engine. The camshaft operates the intake valves of one bank at intervals of 90°, 180° and 270° in crank angle.

In accordance with the present invention, a decrease in quantity of air sucked into the V-type 8-cylinder engine can be suppressed where the engine has intake valves in one of the banks that are operated at intervals of 90°, 180° and 270° in crank angle.

An engine according to another aspect of the present invention includes a plurality of cylinders, intake valves provided to the cylinders respectively and a camshaft operating the intake valves in a predetermined order. The camshaft starts, during closing operation of at least one of a plurality of intake valves, opening operation of another intake valve. A plurality of cams provided to the camshaft are displaced from each other by a crank angle different from an integral multiple of 90° so that a difference in closing timing between the intake valves is within a predetermined range.

In accordance with the present invention, the intake valves provided to respective cylinders are operated by the camshaft in a predetermined order. The camshaft starts, during closing operation of a part of a plurality of intake valves, opening operation of any of other intake valves. During closing operation of an intake valve, if another intake valve is opened, the camshaft has an increased rotational resistance and accordingly has a slower rotational speed. Therefore, for only a part of the cylinders, the closing timing of the intake valve during closing operation is delayed. If the closing timing of the intake valve during the closing operation is delayed, the quantity of air pushed back from the cylinder into the intake manifold while the piston is rising increases, resulting in a decrease in quantity of air sucked into the cylinder. Accordingly, the quantity of sucked air is different between the cylinders. Such a tendency as described above is particularly found in the case where a V-type 8-cylinder engine with a double-plane crankshaft has cams (noses of the cams) of a camshaft that are displaced with respect to each other by an integral multiple of 90° in crank angle (90°, 180°, 270°). Then, those cams provided on the camshaft are displaced with respect to each other by a crank angle different from an integral multiple of 90° so that a difference in intake-valve closing timing (crank angle) between the intake valves is within a predetermined range. In this way, the intake valve is closed earlier to a degree that cancels the decrease in rotational speed of the camshaft, and thus respective crank angles at which the intake valves are closed actually can be made substantially equal to each other. Accordingly, the engine can be provided for which a decrease in quantity of intake air due to decreased rotational speed of the camshaft can be cancelled.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
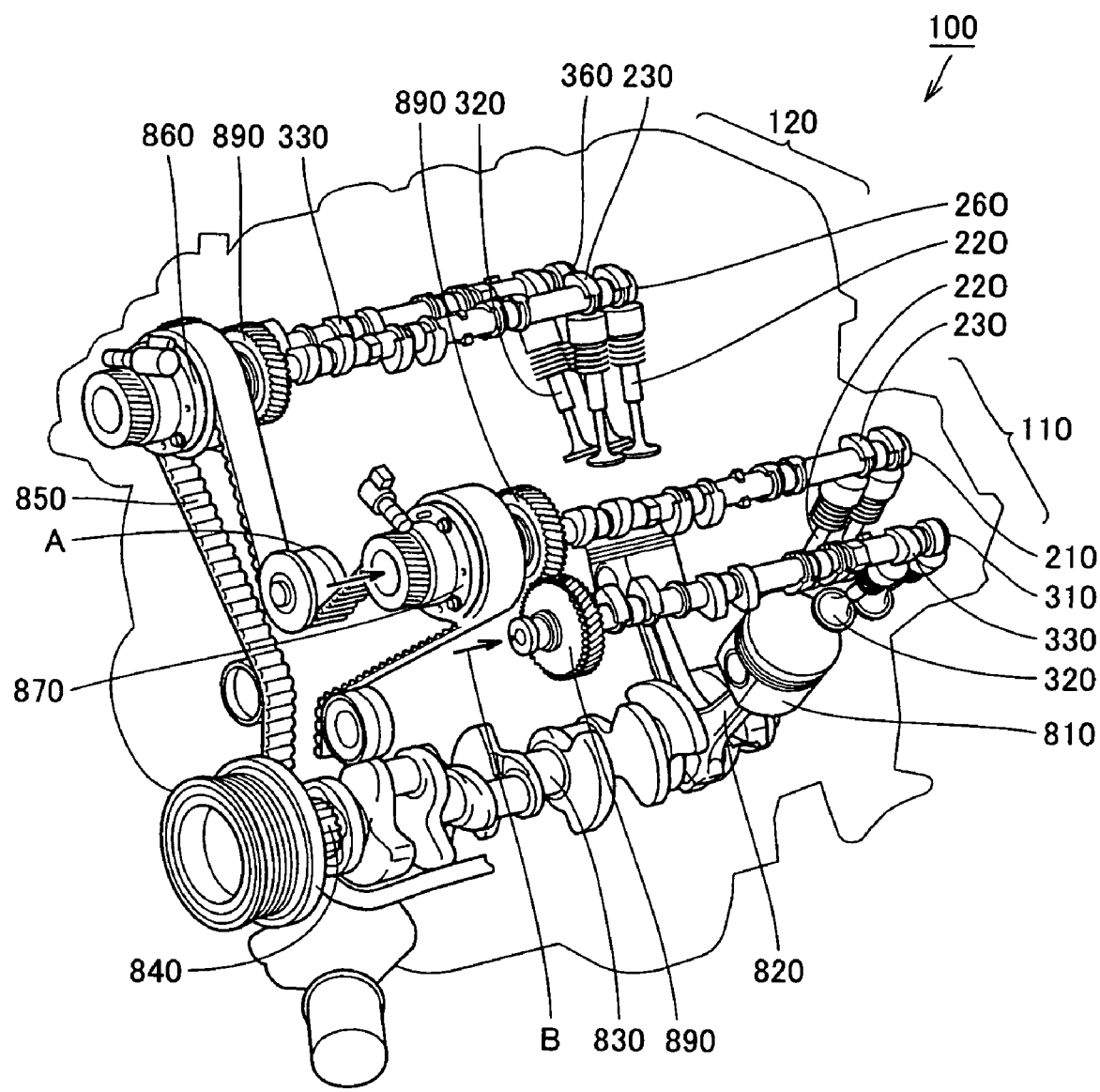
FIG. 1 is a perspective view showing an engine according to a first embodiment of the present invention.

With reference to the drawings, embodiments of the present invention are hereinafter described. In the following description, like components are denoted by like reference characters. They are also named identically and function identically. Therefore, a detailed description thereof is not repeated.

First Embodiment

FIG. 1 is a perspective view of an engine according to a first embodiment of the present invention. Engine 100 is a V-type 8-cylinder engine having a left bank 110 and a right bank 120 arranged in V-shape. While engine 100 in the present embodiment is described as V-type 8-cylinder engine, it may be any engine other than the V8 engine.

Left bank 110 and right bank 120 each have four cylinders. In each cylinder, a piston 810 reciprocating in the cylinder is mounted. Piston 810 is coupled via a connecting rod 820 to a crankshaft 830 that is an output shaft of engine 100. Crankshaft 830 is a double-plane crankshaft. Crankshaft 830 has one end where a crankshaft sprocket 840 is attached.

In left bank 110, an intake camshaft 210 and an exhaust camshaft 310 are disposed. In right bank 120, an intake camshaft 260 and an exhaust camshaft 360 are disposed. On intake camshafts 210 and 260, a plurality of cams 230 having an appropriate profile curve are formed side by side in the axial direction of the camshafts. As intake camshafts 210 and 260 rotate, cam 230 causes an intake valve 220 provided to each cylinder to open and close.

On exhaust camshafts 310 and 360, a plurality of cams 330 having a proper profile curve are formed side by side in the axial direction of the camshafts. As exhaust camshafts 310 and 360 rotate, cam 330 causes an exhaust valve 320 provided to each cylinder to open and close.

On respective ends of these intake camshafts and exhaust camshafts, scissors gears 890 are provided. In each bank, respective scissors gears 890 on the adjacent camshafts mesh.

Further, on respective ends of intake camshafts 210 and 260, camshaft timing pulleys 870 and 860 are provided. Between crankshaft sprocket 840 and camshaft timing pulleys 870 and 860, a timing belt 850 is extended.

The reciprocating motion of piston 810 is converted into rotary motion that is output to crankshaft 830. The rotary motion is transmitted first via timing belt 850 to intake camshafts 210 and 260, and further transmitted via scissors gears 890 to exhaust camshafts 310 and 360.

Figure 2:
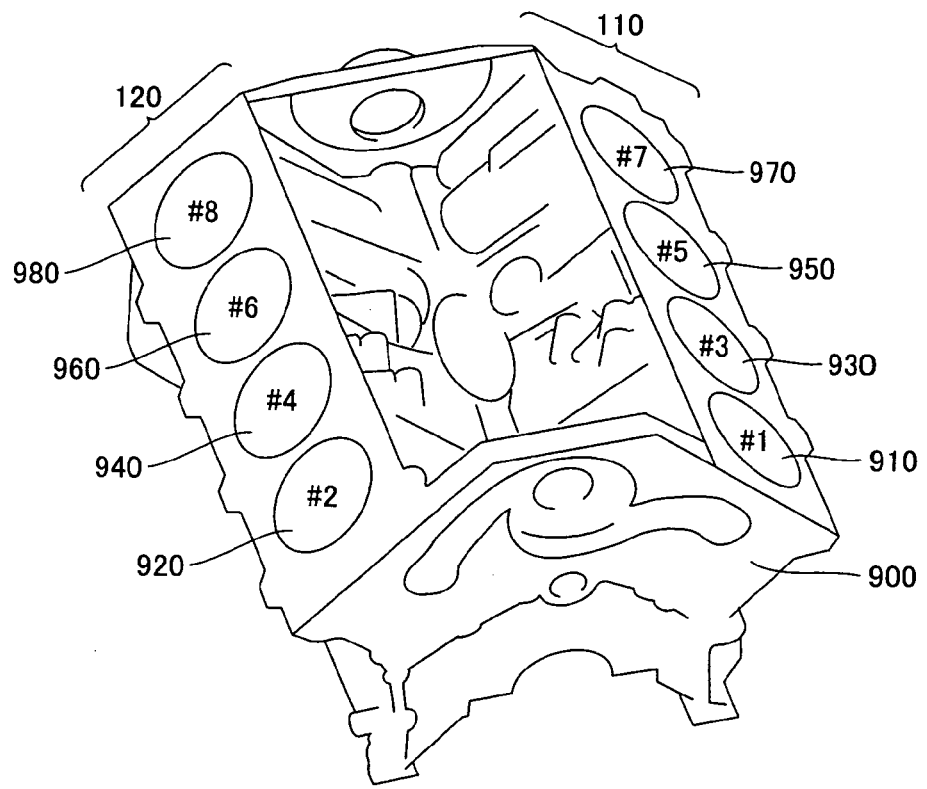
FIG. 2 is a perspective view showing a cylinder block that is a component of the engine in FIG. 1.

FIG. 2 is a perspective view showing a cylinder block 900 that is a component of engine 100. In left bank 110 of cylinder block 900, cylinders 910, 930, 950 and 970 to which respective numbers #1, #3, #5 and #7 are allocated are formed successively from the front side to the rear side of the vehicle. Further, in right bank 120 of cylinder block 900, cylinders 920, 940, 960 and 980 to which respective numbers #2, #4, #6 and #8 are allocated are formed successively from the front side to the rear side of the vehicle.

At #1 cylinder 910, #3 cylinder 930, #5 cylinder 950 and #7 cylinder 970, rotations of intake camshaft 210 and exhaust camshaft 310 cause each intake valve 220 and each exhaust valve 320 to open and close.

At #2 cylinder 920, #4 cylinder 940, #6 cylinder 960 and #8 cylinder 980, rotations of intake camshaft 260 and exhaust camshaft 360 cause each intake valve 220 and each exhaust valve 320 to open and close.

Figure 3:
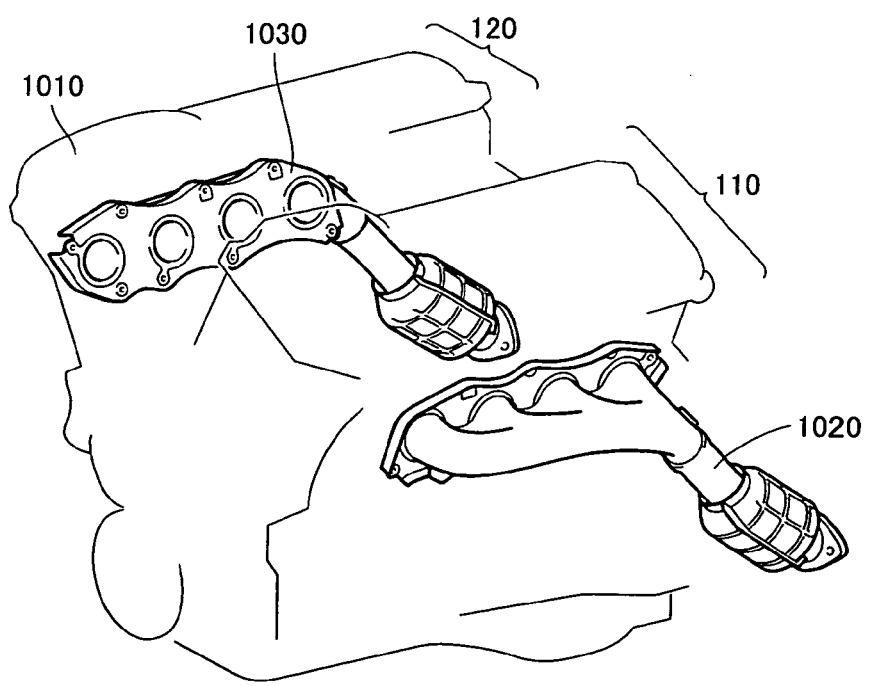
FIG. 3 is a perspective view showing exhaust manifolds provided in the engine in FIG. 1.

FIG. 3 is a perspective view showing exhaust manifolds 1020 and 1030 provided in engine 100. To a cylinder head 1010, exhaust manifolds 1020 and 1030 for left bank 110 and right bank 120 respectively are attached.

Specifically, #1 cylinder 910, #3 cylinder 930, #5 cylinder 950 and #7 cylinder 970 disposed in left bank 110 share exhaust manifold 1020. Exhaust gas discharged from exhaust ports of these cylinders is passed through exhaust manifold 1020 to the outside of the vehicle.

Further, #2 cylinder 920, #4 cylinder 940, #6 cylinder 960 and #8 cylinder 980 disposed in right bank 120 share exhaust manifold 1030. Exhaust gas discharged from exhaust ports of these cylinders is passed through exhaust manifold 1030 to the outside of the vehicle.

Figure 4:
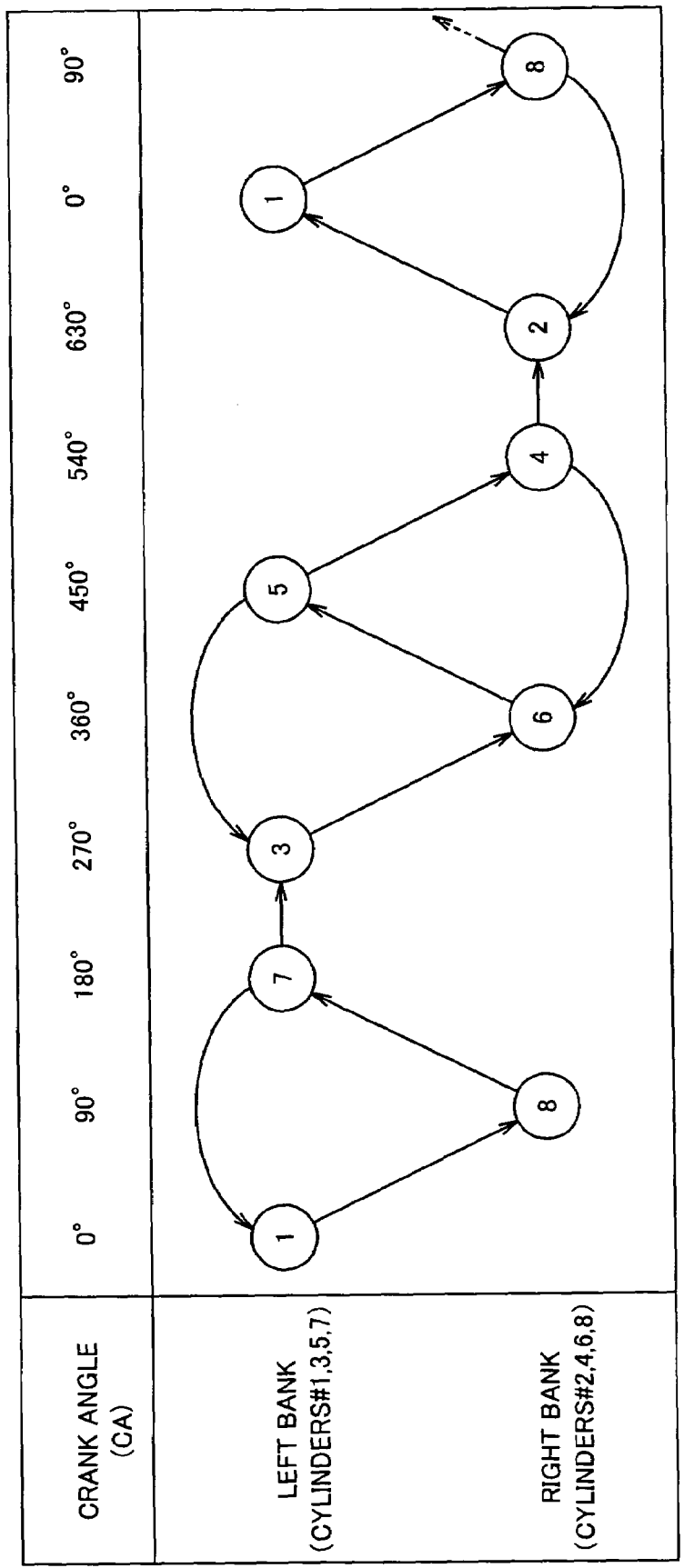
FIG. 4 shows a table of the firing order of the engine in FIG. 1.

FIG. 4 shows a table of a firing order of the engine in FIG. 1. Firing is caused in the cylinders in the order of #1 cylinder 910, #8 cylinder 980, #7 cylinder 970, #3 cylinder 930, #6 cylinder 960, #5 cylinder 950, #4 cylinder 940, and #2 cylinder 920. The firing interval is 90° in crank angle.

While crankshaft 830 makes two rotations (720° in crank angle), one cycle comprised of the four steps: intake stroke, compression stroke, power stroke and exhaust stroke, is completed. Therefore, between two cylinders one of which precedes the other with another cylinder therebetween in firing order, namely between two cylinders at a firing interval of 180° in crank angle, there is a difference in cycle corresponding to one stroke in the cycle.

Thus, when #1 cylinder 910 is in the transition from the intake stroke to the compression stroke, #7 cylinder 970 is in the transition from the exhaust stroke to the intake stroke. Here, during closing operation of intake valve 220 of #1 cylinder 910, intake valve 220 of #7 cylinder 970 starts opening operation. In other words, during closing operation of intake valve 220 of #1 cylinder 910, cam 230 of intake camshaft 210 starts to press down intake valve 220 of #7 cylinder 970.

Since intake camshaft 210 presses down intake valve 220 of #7 cylinder 970, the torque for rotating intake camshaft 210 becomes high.

Figure 5:
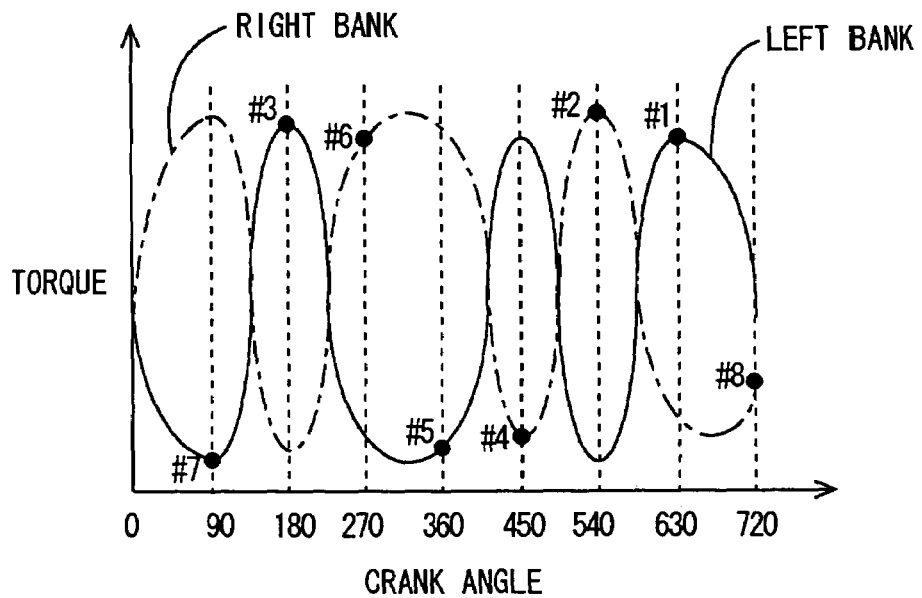
FIG. 5 shows torque necessary for rotating an intake camshaft in FIG. 1.

The torque for rotating intake camshaft 210 becomes high in the case where intake valve 220 of #3 cylinder 930 is closed, in addition to the case where intake valve 220 of #1 cylinder 910 is closed, as shown in FIG. 5.

In FIG. 5, the solid line represents the torque for rotating intake camshaft 210 provided in the left bank. The chain line represents the torque for rotating intake camshaft 260 provided in the right bank. The dots each represent the torque at a crank angle at which intake valve 220 of each cylinder is closed.

The torque could similarly change for right bank 120 as well. As shown in FIG. 5, while intake valves 220 of #2 cylinder 920 and #6 cylinder 960 are closing, the torque for rotating intake camshaft 260 increases.

As the torque for rotating intake camshafts 210 and 260 increases, the rotational speed of intake camshafts 210 and 260 accordingly decreases. Therefore, the timing (crank angle) at which intake valves 220 of #1 cylinder 910, #3 cylinder 930, #2 cylinder 920 and #6 cylinder 960 are closed delays relative to the timing at which intake valves 220 of other cylinders are closed.

When the closing timing of intake valve 220 delays, the quantity of air pushed back from the cylinder into the intake manifold as piston 810 is being lifted increases, resulting in a decrease in quantity of air sucked into the cylinder.

Figure 6:
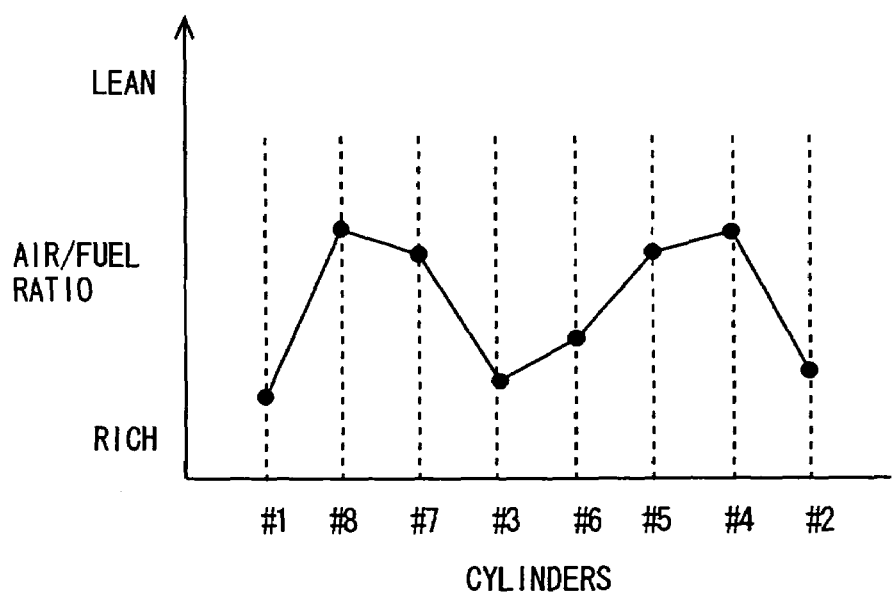
FIG. 6 shows air-fuel ratio of each cylinder.

Therefore, the quantity of air sucked into #1 cylinder 910, #3 cylinder 930, #2 cylinder 920 and #6 cylinder 960 is smaller as compared with other cylinders. In this case, as shown in FIG. 6, the air/fuel ratio of #1 cylinder 910, #3 cylinder 930, #2 cylinder 920 and #6 cylinder 960 is lower than the air/fuel ratio of other cylinders.

Then, in the present embodiment, the crank angle at which intake valves 220 of #1 cylinder 910, #3 cylinder 930, #2 cylinder 920 and #6 cylinder 960 are closed is set to an advanced crank angle with respect to the crank angle at which intake valves 220 of other cylinders are closed.

Figure 7:
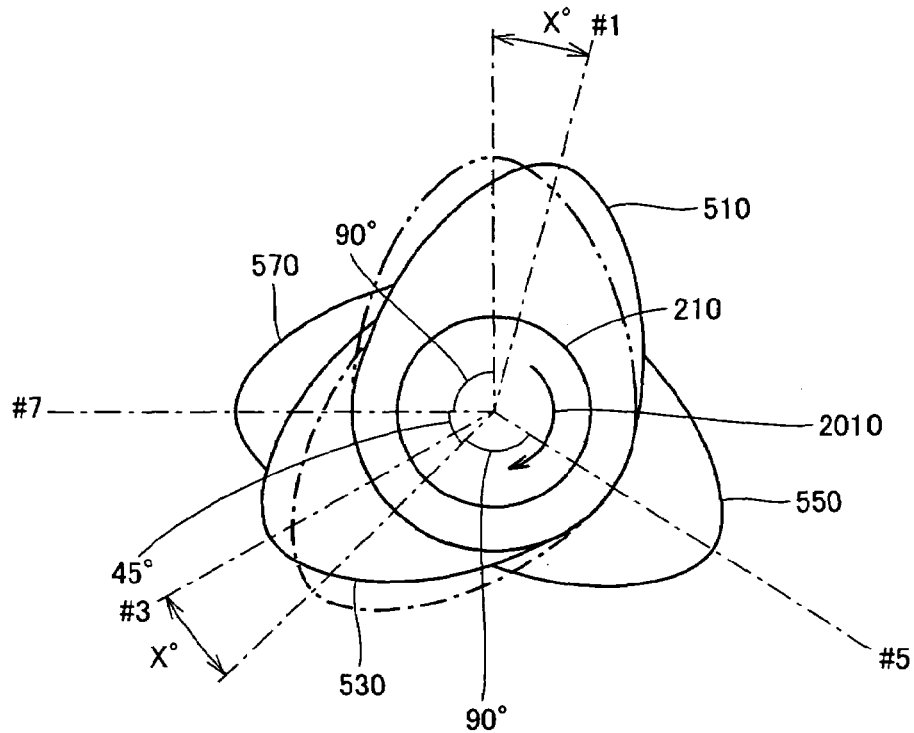
FIG. 7 is a front view (No. 1) showing an intake camshaft in FIG. 1.

FIG. 7 is a front view showing intake camshaft 210 as seen in the direction indicated by an arrow A in FIG. 1. In FIG. 7, scissors gear 890 is not shown. On intake camshaft 210, cams 230 in FIG. 1 are shown as cams 510, 530, 550 and 570 that are formed and aligned in the axial direction of intake camshaft 210.

Cam 510 operates intake valve 220 of #1 cylinder 910. Cam 530 operates intake valve 220 of #3 cylinder 930. Cam 550 operates intake valve 220 of #5 cylinder 950. Cam 570 operates intake valve 220 of #7 cylinder 970.

These cams are each formed to protrude in the radial direction from the axial center of intake camshaft 210. The cams each have a nose that presses down a valve lifter provided to intake valve 220 to cause the valve to open while intake camshaft 210 is rotating. These cams are formed to have the same profile with respect to each other.

Intake camshaft 210 rotates clockwise as indicated by an arrow 2010, and makes one rotation while crankshaft 830 makes two rotations. #5 cylinder 950 is fired after a delay of 270° in crank angle with respect to #7 cylinder 970. Therefore, with respect to the nose of cam 570, the nose of cam 550 is formed at the phase position displaced by 135° (=firing interval 270° CA/2) in the retard direction (the direction opposite to the direction indicated by arrow 2010 in which intake camshaft 210 rotates).

Further, with respect to #7 cylinder 970, #1 cylinder 910 is fired earlier by 180° in crank angle. Therefore, with respect to the nose of cam 570, the nose of cam 510 for opening and closing intake valve 220 of #1 cylinder 910 is formed at the phase position displaced in the advance direction (the direction indicated by arrow 2010 in which intake camshaft 210 rotates) by X° (X>0) further from the position displaced by 90° in the advance direction.

Furthermore, with respect to #5 cylinder 950, #3 cylinder 930 is fired earlier by 180° in crank angle. Therefore, with respect to the nose of cam 550, the nose of cam 530 opening and closing intake valve 220 of #3 cylinder 930 is formed at the phase position displaced by X° in the advance direction further from the position displaced by 90° in the advance direction.

Figure 8:
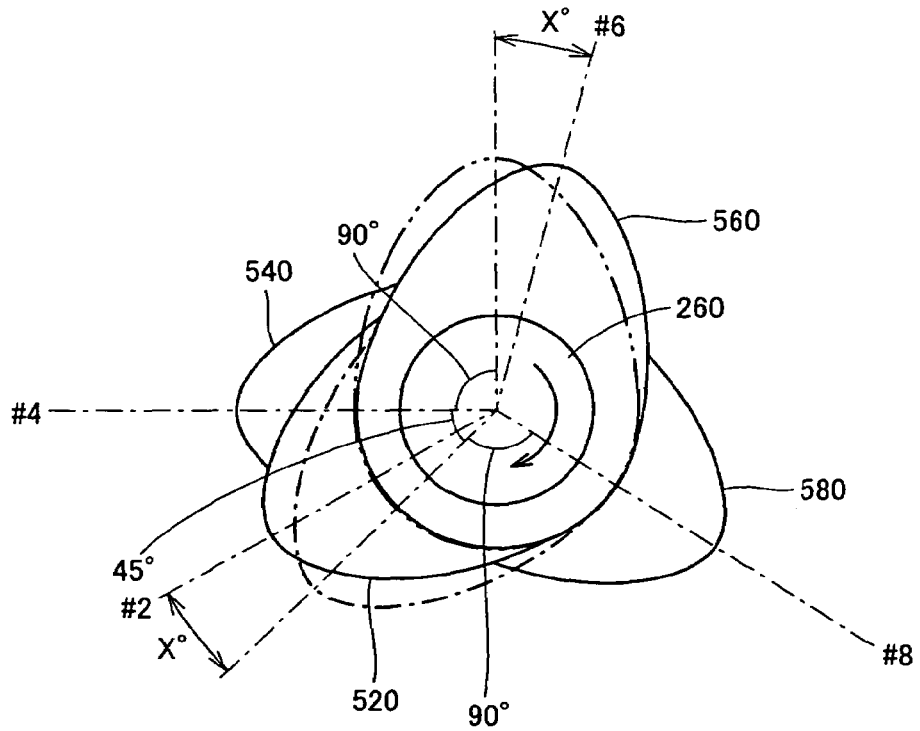
FIG. 8 is a front view (No. 2) showing an intake camshaft in FIG. 1.

Intake camshaft 260 of right bank 120 is similar in shape to intake camshaft 210 of left bank 110. As shown in FIG. 8, with respect to the nose of cam 540 opening and closing intake valve 220 of #4 cylinder 940, the nose of cam 560 opening and closing intake valve 220 of #6 cylinder 960 is formed at the phase position displaced by X° in the advance direction further from the position displaced by 90° in the advance direction.

With respect to the nose of cam 580 opening and closing intake valve 220 of #8 cylinder 980, the nose of cam 520 opening and closing intake valve 220 of #2 cylinder 920 is formed at the phase position displaced by X° in the advance direction further from the position displaced by 90° in the advance direction.

The advance angle (X°) of the nose of cams 510, 530, 520 and 560 represents a value corresponding to the degree to which the closing timing of intake valve 220 is delayed due to decrease in rotational speed of intake camshaft 260.

Accordingly, respective intake valves 220 of #1 cylinder 910, #3 cylinder 930, #2 cylinder 920 and #6 cylinder 960 accompanied by the slower rotational speed of intake camshafts 210 and 260 during closing operation are closed at a crank angle advanced with respect to respective intake valves 220 of other cylinders. Therefore, even if the rotational speed of intake camshafts 210 and 260 becomes slower, the timing at which intake valve 220 is closed can be advanced so that the delay in timing at which intake valve 220 is closed is cancelled. Accordingly, delay in closing timing of intake valves 220 of #1 cylinder 910, #3 cylinder 930, #2 cylinder 920 and #6 cylinder 960 can be suppressed. In other words, a difference in closing timing between intake valves 220 of the cylinders may be set to be within a predetermined range so that intake valves 220 can be substantially uniform in closing timing.

As seen from the above, respective intake valves of #1 cylinder, #3 cylinder, #2 cylinder and #6 cylinder are closed at a crank angle advanced relative to respective intake valves of other cylinders. Thus, even if the rotational speed of the intake camshaft during closing operation of the intake valve becomes slower, the closing timing of the intake valve may be advanced by a crank angle corresponding to the delay in closing timing. Accordingly, the delay in closing timing of the intake valve can be suppressed. In this way, a decrease in quantity of air sucked into a part of the cylinders can be suppressed and thus the cylinders can be made equal to each other in quantity of sucked air.

Instead of advancing the cam position by X°, a VVT (Variable Valve Timing) mechanism may be provided to advance the closing timing of intake valves 220 of #1 cylinder 910, #3 cylinder 930, #2 cylinder 920 and #6 cylinder 960 by X° (2×X° in crank angle).

Alternatively, the cylinders may be fired in the order: #1 cylinder 910, #8 cylinder 980, #4 cylinder 940, #3 cylinder 930, #6 cylinder 960, #5 cylinder 950, #7 cylinder 970, #2 cylinder 920.

In this case, the closing timing of intake valves 220 of #3 cylinder 930, #7 cylinder 970, #2 cylinder 920 and #4 cylinder 940 may be advanced by X°.

Further, instead of advancing the closing timing of intake valve 220 by X° (2×X° in crank angle), the lift of intake valve 220 may be decreased.

Second Embodiment

In the following, a second embodiment of the present invention is described. The present embodiment differs from the above-described first embodiment in that, in addition to the crank angle at which the intake valve is closed, the crank angle at which the exhaust valve is opened is advanced by X°. Other components are similar to those of the first embodiment, and they are identical in function to those of the first embodiment. Therefore, the detailed description thereof is not repeated here.

Figure 9:
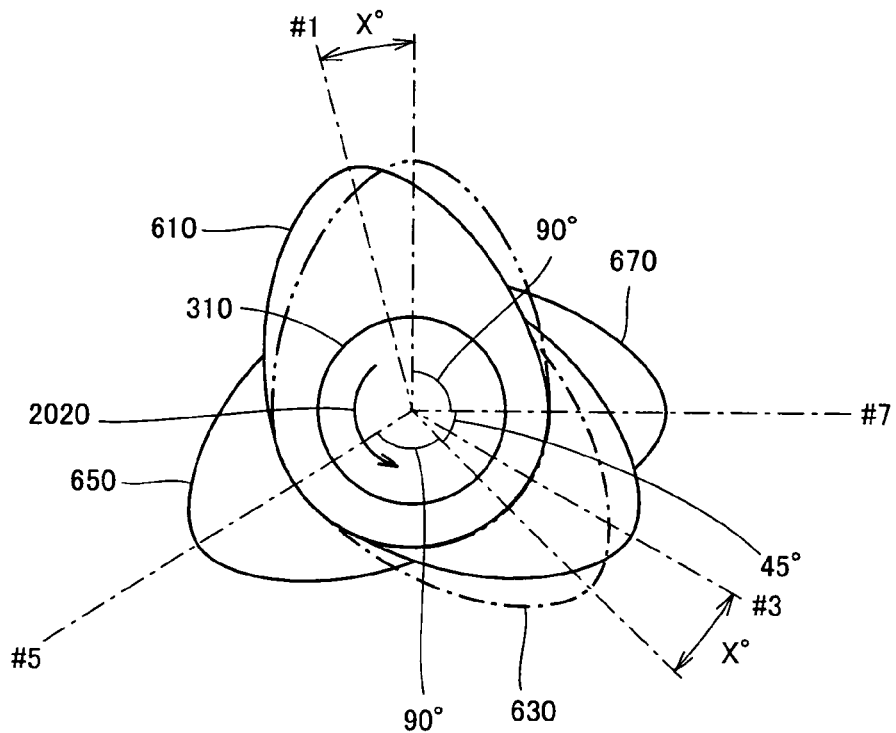
FIG. 9 is a front view (No. 1) showing an exhaust camshaft of an engine according to a second embodiment of the present invention.

Referring to FIG. 9, exhaust camshaft 310 in the present embodiment is described. FIG. 9 is a front view showing exhaust camshaft 310 as seen in the direction indicated by an arrow B in FIG. 1. In FIG. 9, scissors gear 890 is not shown.

On exhaust camshaft 310, cams 330 in FIG. 1 are shown as cams 610, 630, 650 and 670 that are formed and aligned in the axial direction of the camshaft. Cam 610 opens and closes exhaust valve 320 of #1 cylinder 910. Cam 630 opens and closes exhaust valve 320 of #3 cylinder 930. Cam 650 opens and closes exhaust valve 320 of #5 cylinder 950. Cam 670 opens and closes exhaust valve 320 of #7 cylinder 970.

These cams are each formed to protrude in the radial direction from the axial center of exhaust camshaft 310. These cams each have a nose that presses down a valve lifter provided to exhaust valve 320 to cause the valve to open while exhaust camshaft 310 is rotating. These cams are formed to have the same profile with respect to each other.

Exhaust camshaft 310 rotates anticlockwise as indicated by an arrow 2020, and makes one rotation while crankshaft 830 makes two rotations. #1 cylinder 910 is fired earlier by 270° in crank angle with respect to #3 cylinder 930. Therefore, with respect to the nose of cam 610, the nose of cam 630 is formed at the phase position displaced by 135° (=firing interval 270° CA/2) in the retard direction (the direction opposite to the direction indicated by arrow 2020 in which exhaust camshaft 310 rotates).

Further, with respect to #7 cylinder 970, #1 cylinder 910 is fired earlier by 180° in crank angle. Therefore, with respect to the nose of cam 670, the nose of cam 610 for opening and closing exhaust valve 320 of #1 cylinder 910 is formed at the phase position displaced in the advance direction by X° further from the position displaced by 90° in the advance direction.

Furthermore, with respect to #5 cylinder 950, #3 cylinder 930 is fired earlier by 180° in crank angle. Therefore, with respect to the nose of cam 650, the nose of cam 630 opening and closing exhaust valve 320 of #3 cylinder 930 is formed at the phase position displaced by X° in the advance direction further from the position displaced by 90° in the advance direction.

Figure 10:
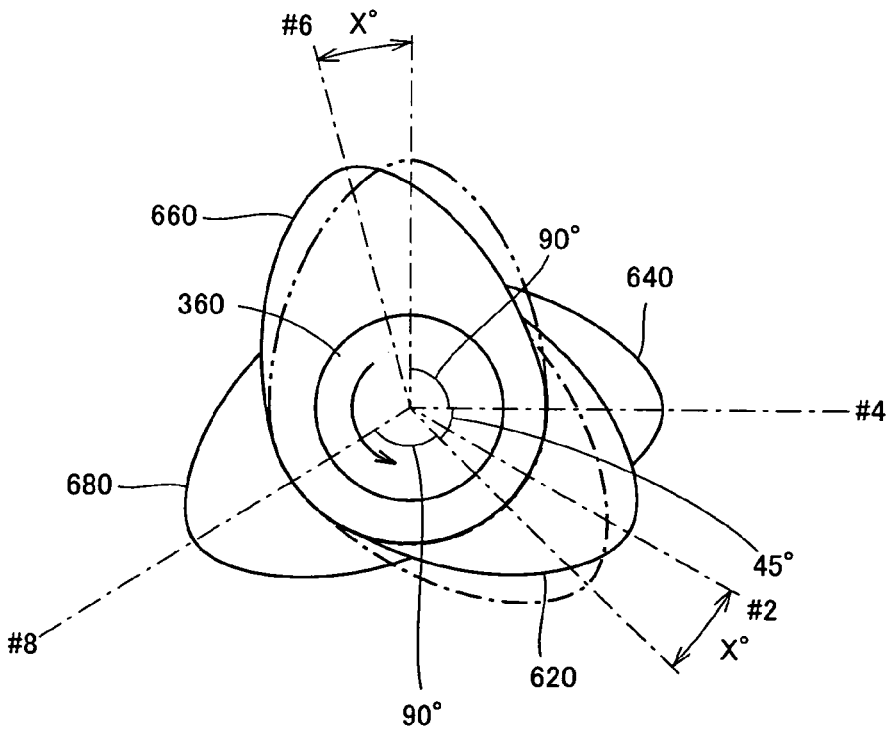
FIG. 10 is a front view (No. 2) showing an exhaust camshaft of the engine according to the second embodiment of the present invention.

Exhaust camshaft 360 of right bank 120 is similar in shape to exhaust camshaft 310 of left bank 110. As shown in FIG. 10, with respect to the nose of cam 640 opening and closing exhaust valve 320 of #4 cylinder 940, the nose of cam 660 opening and closing exhaust valve 320 of #6 cylinder 960 is formed at the phase position displaced by X° in the advance direction further from the position displaced by 90° in the advance direction.

With respect to the nose of cam 680 opening and closing exhaust valve 320 of #8 cylinder 980, the nose of cam 620 opening and closing exhaust valve 320 of #2 cylinder 920 is formed at the phase position displaced by X° in the advance direction further from the position displaced by 90° in the advance direction.

Thus, the opening timing of respective exhaust valves 320 of #1 cylinder 910, #3 cylinder 930, #2 cylinder 920 and #6 cylinder 960 can be advanced. Accordingly, an increase in overlap period in which both of intake valve 220 and exhaust valve 320 open can be suppressed. Here, the increase is caused due to the advanced crank angle at which intake valve 220 is closed. In this way, the cylinders are made uniform in overlap period, and thus respective intake air quantities of the cylinders can be made equal to each other.

As seen from the above, respective exhaust valves of #1 cylinder 910, #3 cylinder 930, #2 cylinder 920 and #6 cylinder 960 of the engine in the present embodiment are opened at a crank angle advanced relative to exhaust valves of other cylinders. Accordingly, even in the case where the crank angle at which the intake valve is closed is advanced, an increase in overlap period of the intake valve and the exhaust valve can be suppressed. Thus, respective overlap periods of the cylinders are made equal to each other and respective intake air quantities of the cylinder can be made equal to each other.

Instead of advancing the cam position by X°, a VVT (Variable Valve Timing) mechanism may be provided to advance the closing timing of exhaust valves 320 of #1 cylinder 910, #3 cylinder 930, #2 cylinder 920 and #6 cylinder 960 by X° (2×X° in crank angle).

Alternatively, the cylinders may be fired in the order: #1 cylinder 910, #8 cylinder 980, #4 cylinder 940, #3 cylinder 930, #6 cylinder 960, #5 cylinder 950, #7 cylinder 970, #2 cylinder 920.

In this case, the closing timing of exhaust valves 320 of #3 cylinder 930, #7 cylinder 970, #2 cylinder 920 and #4 cylinder 940 may be advanced by X°.

Further, the advance angle of exhaust valve 320 may be larger or smaller than the advance angle of intake valve 220.

Furthermore, instead of advancing the closing timing of exhaust valve 320 by X° (2×X° in crank angle), the lift of exhaust valve 320 may be decreased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An engine comprising a plurality of cylinders, intake valves provided to said cylinders respectively and a camshaft operating said intake valves in a predetermined order, said camshaft starting, during closing operation of a first intake valve of the plurality of intake valves, opening operation of a second intake valve, rotational speed of said camshaft during the closing operation of said first intake valve being slower than rotational speed of said camshaft during opening operation of said second intake valve, and a cam operating said first intake valve being disposed at a position displaced, in advance direction with respect to a cam operating said second intake valve, by a distance larger than a distance corresponding to an interval between a timing at which a piston of a cylinder provided with said first intake valve is at top dead center position and a timing at which a piston of a cylinder provided with said second intake valve is at a top dead center position.

2. The engine according to claim 1, wherein
said engine is a V-type 8-cylinder engine with a double-plane crankshaft, and
said distance corresponding to the interval between the timing at which the piston of the cylinder provided with said first intake valve is at top dead center position and the timing at which the piston of the cylinder provided with said second intake valve is at the top dead center position is 90°.

3. The engine according to claim 1, further comprising exhaust valves provided to said cylinders respectively so that said exhaust valves are each operated according to the characteristic of said intake valve.

4. The engine according to claim 3, wherein
said exhaust valve is opened at a more advanced crank angle as the intake valve provided to the cylinder that is the same as the cylinder to which the exhaust valve is provided is closed at a more advanced crank angle.

* * * * *